Oct. 25, 1932.   L. H. DAVIS   1,883,882

UNIVERSAL JOINT

Filed Nov. 14, 1931

Inventor

LEWIS H. DAVIS

By Spencer, Hardman & Fehr

Attorneys

Patented Oct. 25, 1932

1,883,882

UNITED STATES PATENT OFFICE

LEWIS H. DAVIS, OF DAYTON, OHIO, ASSIGNOR TO DELCO PRODUCTS CORPORATION, OF DAYTON, OHIO, A CORPORATION OF DELAWARE

UNIVERSAL JOINT

Application filed November 14, 1931. Serial No. 575,008.

This invention relates to improvements in swivel joints and particularly to swivel joints adapted to be used in connection with shock absorbers for motor vehicles.

It is among the objects of the present invention to provide a self-lubricating and self-adjusting swivel joint between two reciprocable power transmitting members.

Further objects and advantages of the present invention will be apparent from the following description, reference being had to the accompanying drawing wherein a preferred embodiment of one form of the present invention is clearly shown.

Figure 1:
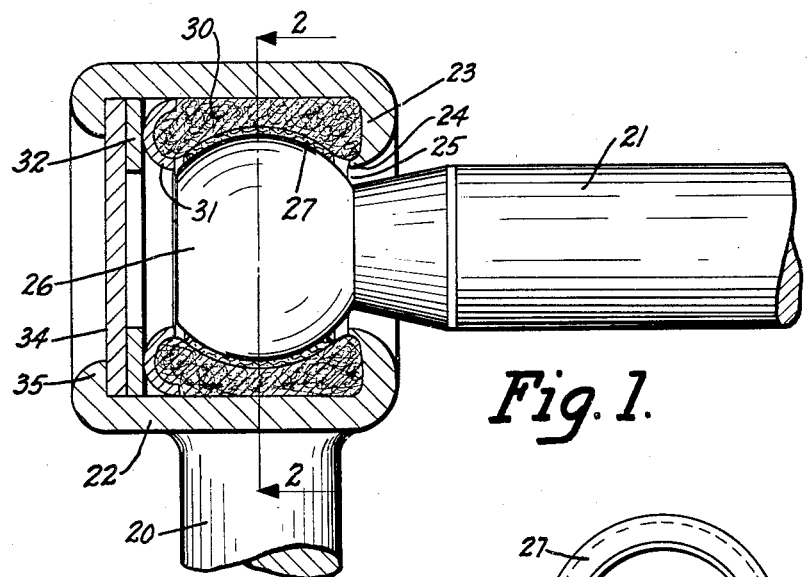
Fig. 1 is a view of the swivel joint showing the socket portion thereof in section.
Figure 3:
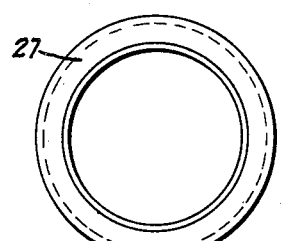
Fig. 3 is a detail view of the liner provided on the ball end shaft of the joint.
Figure 2:
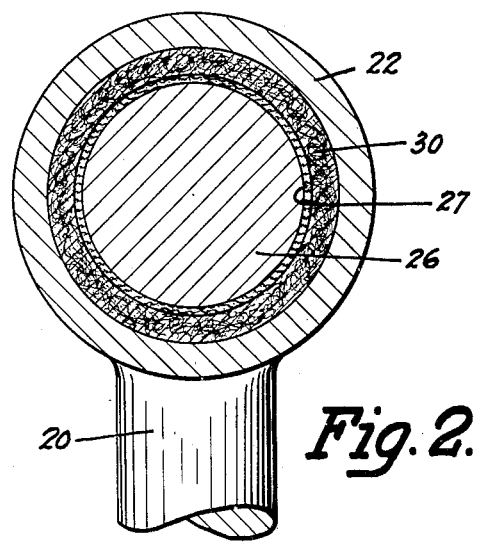
Fig. 2 is a sectional view taken substantially along the line 2—2 of Fig. 1.

Referring to the drawing the numerals 20 and 21 respectively, designate the link and stub shaft forming the reciprocable power transmitting members which are secured together by the improved swivel joint. The link 20 provides the socket member of the joint and comprises a tubular head portion 22 formed thereon or secured thereto in any suitable manner. Preferably the head portion 22 is secured to the link 20 by the welding process. The head 22 has an inwardly extending flange 23 at its one end, the inner edge of said flange being reduced and turned inwardly as at 24 defining an opening 25 at this end of the head. The opposite end of the tubular head is open before being assembled.

The shaft 21 has a ball end 26 of lesser diameter than the inside diameter of the tubular head portion 22, however, the diameter of the ball 26 is greater than the diameter of the opening 25. In assembling the shaft portion 21 is inserted into the head portion 22 through the open end so that the ball end 26 is contained within the head portion 22 while the shaft 21 extends through the opening 25 of said head portion.

The ball 26 has a metallic lining 27, preferably of woven wires, said lining being impregnated with a comparatively hard lubricant such as graphite or the like. To maintain the ball in the position in the head portion 22 so that its center lies on the axis of the shaft 20, a fibrous bearing 30 is wedged into the spaces between the ball 26 and the inner wall of the head 22. As will be seen in Fig. 1 the fibrous bearing 30 is wedged into the space defined by the outer surface of the woven metal lining 27 about the ball end and the inner wall of the housing 22 including also the inner surface of the inwardly extending flange 23.

Figure 4:
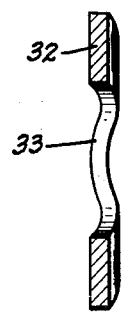
Fig. 4 is a sectional view of the spring washer.

The outer edge of the fibrous bearing annulus 30 adjacent the extreme end of the ball end 26 of shaft 21 is substantially in alignment with the end of said ball end 26. This end of the fibrous bearing annulus is engaged by the concave side of an abutment ring 31 the cross sectional shape of which is substantially semicircular. Upon this abutment ring there is placed a spring washer 32 detailedly shown in Fig. 4. The body of this spring washer 32 is provided with undulations as shown at 33. A cover plate 34 is press fitted into the open end of the tubular head portion 22 of shaft 20 until the undulations 33 of the spring washer 32 are completely straightened, then the end of the housing of the tubular head portion 22 is sweged over as at 35 to maintain the cover plate 34 in this pressing engagement with the spring washer 32.

The spring washer 32, as may clearly be seen, is completely compressed and thus can move only expansively so that it exerts a pressure upon the abutment ring 31 causing said abutment ring to wedge the fibrous bearing 30 into the space betwen the ball end lining 27 and the interior walls of the tubular head portion 22 to maintain said bearing in intimate contact with said lining and tubular head portion thereby to support the ball end 26 of shaft 21 in proper position within the tubular head portion 22.

The fibrous material of bearing 30 is impregnated with a lubricant whereby the lubricant within the woven metal lining 27 may be replenished as it is depleted during the use of the device.

In the present invention applicant has provided a swivel joint which is self lubricating and self adjusting said joint thus being particularly adapted to withstand the pounding efforts between two shafts which transmit motion in either direction.

While the form of embodiment of the present invention as herein disclosed, constitutes a preferred form, it is to be understood that other forms might be adopted, all coming within the scope of the claims which follow.

What is claimed is as follows:

1. A swivel joint between two power transmitting shafts comprising, in combination, a ball end on the one shaft; a tubular head on the other shaft, adapted to receive the said ball end; a metal lining about the ball end; a fibrous bearing in the tubular head supporting the ball end so that it is movable only rotatably about its center; a spring washer substantially coaxial of the shaft having the ball end; and means retained in the tubular head, engaging and completely compressing said spring washer which engages an edge of the fibrous bearing to urge it in a direction substantially parallel to the axis of the ball end shaft thus to wedge said bearing into constant contact with the tubular head and metal lining about the ball end.

2. A swivel joint between two power transmitting shafts comprising, in combination, a tubular head on the one shaft; a ball end on the other shaft, extending into said tubular head; a woven metal lining fitting about the ball end; an annulus of fibrous material wedged between the tubular head and lined ball end, said material forming a bearing which supports the ball end movable only rotatably about its center; a spring washer in said tubular head, substantially coaxial of the ball end shaft, said spring washer engaging an edge of the fibrous annulus; and a cover plate fitting into the tubular head, adapted to be pressed into and retained in a position in which it completely compresses the spring washer, thereby causing said washer to exert constant pressure upon the edge of the fibrous annulus in a direction along the axis of the ball end shaft to keep the fibrous annulus wedged into constant engagement with the tubular head and ball end lining.

3. A swivel joint between two power transmitting shafts comprising, in combination, a tubular head on the one shaft; a ball end on the other shaft, extending into said tubular head; a woven metal lining fitting about the ball end; an annulus of lubricant impregnated fibrous material wedged between the tubular head and lined ball end, providing a bearing which supports the ball end so that its center is substantially on the axis of the shaft having the tubular head and that said ball end is movable only rotatably about its center; an abutment ring engaging the edge of the fibrous annulus adjacent the ball end of the shaft; a spring washer engaging said abutment ring; and a disc presesd into and retained within said tubular head, said disc completely compressing said spring washer against the abutment ring whereby the fibrous bearing is constantly urged between the tubular head and ball end to support the latter in proper position within said tubular head.

4. A swivel joint between two power transmitting shafts comprising, in combination, a tubular head on the one shaft; a ball end on the other shaft, extending into said tubular head; a woven metal lining fitting about the ball end; an annulus of lubricant impregnated fibrous material wedged between the tubular head and lined ball end, providing a bearing which supports the ball end so that its center is substantially on the axis of the shaft having the tubular head and that said ball end is movable only rotatably about its center; an abutment ring shaped to have a semicircular cross-sectional shape, having its concave side engaging the edge of the fibrous annulus substantially in alinement with the extremity of the ball end of the one shaft; a spring washer engaging the abutment ring; and a cover plate pressed into and retained within said tubular head so as to completely compress the spring washer which constantly urges the abutment ring toward and against the fibrous annulus to wedge it into intimate contact with the interior of the tubular head and ball end lining.

In testimony whereof I hereto affix my signature.

LEWIS H. DAVIS.